Oct. 29, 1929.                G. H. FORSYTH                1,733,727
                                  WHEEL
                            Filed Jan. 26, 1923
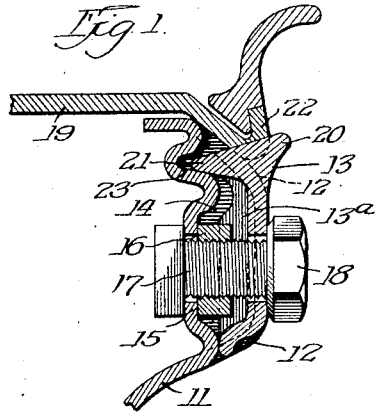
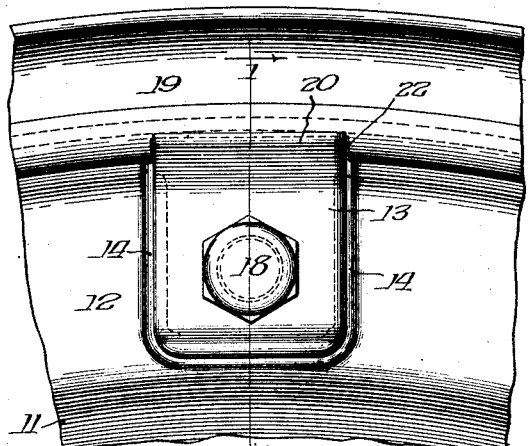
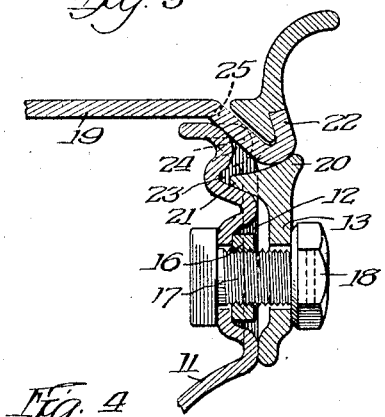
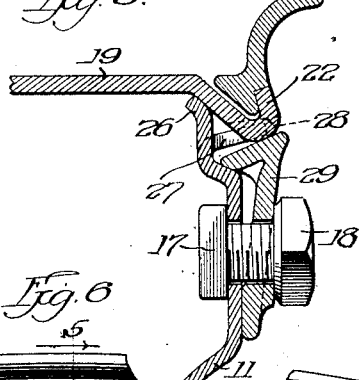
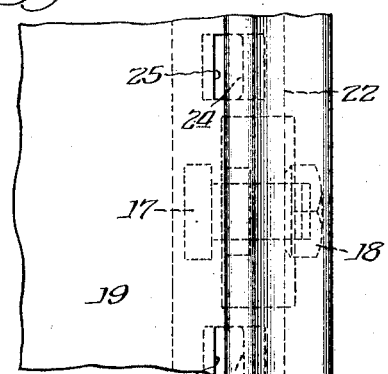
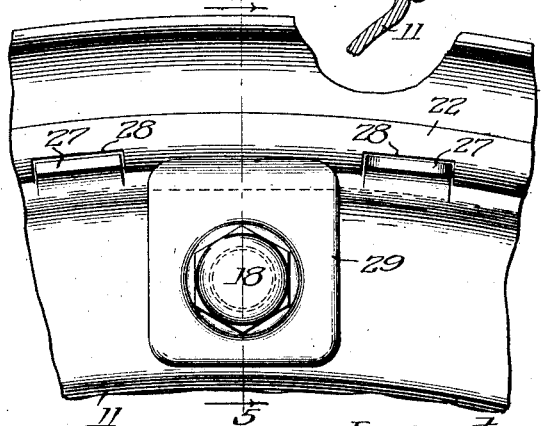
Inventor:
George H. Forsyth,
By Cromwell, Greist & Warden
                       Attys.

Patented Oct. 29, 1929

1,733,727

UNITED STATES PATENT OFFICE

GEORGE H. FORSYTH, OF CHICAGO, ILLINOIS, ASSIGNOR, BY MESNE ASSIGNMENTS, TO STEEL WHEEL CORPORATION, OF LANSING, MICHIGAN, A CORPORATION OF MICHIGAN

WHEEL

Application filed January 26, 1923. Serial No. 615,009.

The invention has for one of its objects the provision in a wheel particularly of the disk type of a secure connection between the wheel body and rim directly or indirectly whereby to prevent creeping of the rim on the wheel body under traction stresses.

Other advantageous features of the invention will become apparent to those skilled in the art as the specification proceeds.

The usual provision for effecting connection between the rim and the wheel body has been a "driving lug" disposed in the median plane of the rim. With the wood wheel having a metal felly, this has been in the main satisfactory, but with disk wheels it necessitates peripherally flanging the disk body to underlie the rim for a lateral distance more than half the width of the rim in order to afford an anchorage for the driving lug. This adds from four to six inches to the diameter of the sheet from which the disk body is blanked, thereby considerably increasing the cost of the metal and the weight of the wheel without serving any useful purpose other than affording a place of engagement for the driving lug.

By my invention the driving connection between the rim and wheel is adjacent the front side of the rim and the disk body need not extend laterally to any considerable extent beneath the rim.

The features of construction by which the above outlined objects are obtained will be readily apparent from the following detailed description of illustrative embodiments thereof predicated upon the accompanying drawing, wherein Fig. 1 is a fragmentary radial section through a portion of a disk body and rim including the invention, taken on the line 1—1 of Fig. 2;

Fig. 2 is a fragmentary side elevation of the parts shown in section in Fig. 1;

Fig. 3 is a view similar to Fig. 1 but of a modified construction;

Fig. 4 is a top plan view of Fig. 3;

Fig. 5 is a view similar to Figs. 1 and 3 representing a modified embodiment; and Fig. 6 is a front elevation of the construction shown in Fig. 5.

Having more particular reference to the several figures of the drawing and specifically to Fig. 1, the disk body of the wheel indicated at 11 follows in its peripheral portion the general contour indicated at 12 but at intervals corresponding to the location of the rim retaining clips 13 is locally recessed as indicated at 14 to accommodate the clips. The metal forming the bottom of the recess 14 is additionally depressed at 15 to receive a lock nut 16 of the bolt 17 which, in co-operation with the nut 18, serves by means of the clip 13 to position the rim 19 upon the wheel body.

The clip 13 advantageously includes a head portion 20 and a nose 21. The head is so arranged as to enter a slot or other opening formed in that portion 22 of the rim 19 which overhangs the front of the disk while the nose 21 bears with a wedging action upon the inclined face formed by recessing the disk at 23.

It will thus be seen that the clip 13 forms a key interlocking with the rim 19 at 22 and in turn being interlocked with the wheel disk by the side walls of the recess 14 within which it is disposed. This interlocking relation between the three wheel members effectually prevents creeping of the rim upon the wheel and removes the strain from the bolt 17. An extension of the disk periphery beneath the rim to and beyond the center thereof is rendered entirely unnecessary and the weight and cost of metal is reduced.

Referring to Figs. 3 and 4 of the drawing a slightly different form of construction is shown wherein the disk in its peripheral portion is recessed in substantially the same manner although to a less depth to accommodate the locking nut 16 on the bolt 17 and also to receive and co-operate with the nose 21 of the clip 13.

In this form of construction, however, a marginal portion of the disk body is extended forwardly at 24 and adapted to be received into a slot or other opening 25 formed in the overhanging portion 22 of the rim, whereby the rim and disk are interlocked against angular displacement by integral portions thereof.

Referring now to Figs. 5 and 6 of the drawing, the periphral portion of the disk 11 at its margin is shown as notched at intervals and while throughout the major portion of its extent the disk margin underlies and supports the rim 19 at 26, at the notched portions the metal is forwardly bent as indicated at 27 for engagement within the notches 28 of the overhanging portion 22 of the rim thereby effecting a driving connection between the disk and rim by means of the interlocking of integral portions thereof adjacent the front of the wheel.

The clip 29 of Figs. 5 and 6 may be in the form either of an annulus or of individual segments, the illustration in Fig. 5 being applicable to either. It is to be understood that where the term "clip" is employed herein the term is not limited in its meaning to segment clips spaced about the wheel.

It will be observed that the invention of the several embodiments is characterized by the fact that the interlocking of the rim with the disk, whether directly or indirectly, is effected by means capable of engagement and disengagement by a lateral movement as the rim is assembled as distinguished from the vertical engagement and release of the usual driving lug carried by the rim and projecting inwardly of the wheel into an aperture formed in the felly A further advantage of the invention as shown in Fig. 1, which advantage is also capable of association in the embodiment illustrated in the other figures, is the reception of individual clips within local recesses in such manner as to result in a substantially flush surface as between the wheel periphery and the clips by which the rim is positioned and retained. These clips may also, as particularly shown in Fig. 1, have side flanges 13ª which side flanges additionally serve to prevent the ingress of dirt and the like.

The construction herein set out, as distinguished from the prior art as characterized by a driving connection between the wheel and rim at a single point by means of the usual driving lug, has the added advantage that the driving engagement is at a plurality of points about the circumference of the wheel by means of the interlocking, whether direct or indirect. The integral interlock by means of tongue and slot operate in both directions in retarding and in accelerating, as also does the indirect interlock by the abutment of the clips against the side walls of the recesses within which they are mounted.

It will be noted also, having special reference to Figs. 1, 3 and 5 of the drawing, that the extent to which the part 22 of the rim extends inwardly of the wheel to provide for interlocking engagement with the disk results in approximately a 45° angle of contact between the rear face thereof and the front face of the disk margin, whereas a smaller angle to the horizontal is more efficient in effecting a tight compressive fit of rim and disk. This is compensated for by the flatter angle of engagement between the nose of the clip and the disk in the recess 23, whereby the one supplements the other in securing a firm positioning of the rim on the disk; the wedging engagement of the disk both with the rim and the clip being cooperative in that both tend to force the rim outwardly and the disk inwardly though acting along lines slightly divergent.

I claim:

1. A disk wheel comprising body and rim members, and means to interlock the same against relative angular movement, said means comprising an integral portion of the disk body projecting into an opening of the rim as the two are assembled by relative lateral movement.

2. A disk wheel comprising body and rim members, the disk margin radially slitted and bent at intervals to form forwardly projecting tongues and the rim at corresponding intervals provided with openings to receive said tongues whereby to interlock the body and rim members against relative angular displacement.

3. A disk wheel comprising body and rim members and a rim-retaining clip, the disk having wedge engagement both with the rim and clip and the rim and disk interlocked against relative angular displacement.

4. A disk wheel comprising body and rim members and a rim retaining clip, the disk having wedge engagement both with the rim and clip and the rim and disk interlocked against relative angular displacement by a projection from one entering within an opening in the other.

5. A disk wheel comprising body and rim members and a rim-retaining clip, the disk having wedge engagement both with the rim and clip and the rim and disk interlocked against relative angular displacement by a projection from the disk entering within an opening in the rim.

In testimony whereof I have hereunto subscribed my name.

GEORGE H. FORSYTH.